United States Patent
Takagi

(10) Patent No.: US 8,893,471 B2
(45) Date of Patent: Nov. 25, 2014

(54) EXHAUST APPARATUS FOR FOUR WHEELED UTILITY VEHICLE

(71) Applicant: Kawasaki Jukogyo Kabushiki Kaisha, Hyogo (JP)

(72) Inventor: Jun Takagi, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 35 days.

(21) Appl. No.: 13/780,349

(22) Filed: Feb. 28, 2013

(65) Prior Publication Data

US 2014/0237994 A1    Aug. 28, 2014

(51) Int. Cl.
| | |
|---|---|
| *F01N 3/00* | (2006.01) |
| *F01N 3/10* | (2006.01) |
| *F01N 5/02* | (2006.01) |
| *F01N 13/08* | (2010.01) |
| *F01N 1/10* | (2006.01) |
| *F01N 11/00* | (2006.01) |

(52) U.S. Cl.
CPC ..................................... *F01N 11/00* (2013.01)
USPC ................. 60/276; 60/299; 60/320; 181/227; 181/228; 181/252

(58) Field of Classification Search
USPC .................. 60/276, 299, 301, 313, 320, 324; 181/227, 228, 247, 252, 256
See application file for complete search history.

(56) References Cited

U.S. PATENT DOCUMENTS

| | | | | |
|---|---|---|---|---|
| 4,484,440 | A * | 11/1984 | Oki et al. ........................ | 60/276 |
| 4,617,795 | A * | 10/1986 | Abthoff et al. .................. | 60/276 |
| 4,833,882 | A * | 5/1989 | Yasuda et al. ................... | 60/276 |
| 7,426,980 | B2 * | 9/2008 | Bassani ......................... | 181/238 |
| 7,610,748 | B2 * | 11/2009 | Kono et al. ..................... | 60/276 |
| 2004/0129482 | A1* | 7/2004 | Takenaka et al. ............. | 180/309 |
| 2008/0256927 | A1* | 10/2008 | Kikuchi et al. ................. | 60/276 |
| 2009/0000862 | A1* | 1/2009 | Buell et al. ..................... | 181/212 |

FOREIGN PATENT DOCUMENTS

JP          2012-127202          7/2012

* cited by examiner

*Primary Examiner* — Audrey K Bradley
(74) *Attorney, Agent, or Firm* — Wenderoth, Lind & Ponack, L.L.P.

(57) ABSTRACT

Provided is an exhaust apparatus for a utility vehicle which discharges exhaust gas from exhaust pipes connected to exhaust ports of an engine including cylinders, the apparatus including an exhaust gathering portion gathering the exhaust pipes, a catalyst portion located on a downstream side of the exhaust gathering portion and purifying the exhaust gas, and a sensor attaching pipe provided between the exhaust gathering portion and the catalyst portion and to which an exhaust gas sensor is detachably attached, wherein the sensor attaching pipe, in a state where the exhaust gas sensor is attached, has a height in which a sensing portion of the exhaust gas sensor is located in the sensor attaching pipe, and the sensor attaching pipe is provided such that a top end to which the exhaust gas sensor is detachably attached is located above a base end and away from a surrounding heat source.

5 Claims, 4 Drawing Sheets

EXHAUST APPARATUS FOR FOUR WHEELED UTILITY VEHICLE

BACKGROUND OF THE INVENTION

1. Field of the Invention

The present invention relates to an exhaust apparatus for four wheeled vehicle. More specifically, the present invention relates to an exhaust apparatus which is mounted on a utility vehicle mainly suitable for driving on irregular ground and discharges exhaust gas from an engine.

2. Description of the Related Art

Conventionally, an exhaust gas sensor that senses a particular ingredient in exhaust gas is attached to exhaust pipes. Since high-temperature exhaust gas flows in the exhaust pipes, the surfaces of the exhaust pipes and the atmosphere around the exhaust pipes become hot. Therefore, the exhaust gas sensor attached to the exhaust pipes is required to have high heat resistance.

The exhaust gas sensor is provided with a sensor body including a sensing portion that senses a particular ingredient in exhaust gas, and a harness for supplying electric power to the sensor body and transmitting a signal outputted from the sensor body, wherein a connecting portion of the sensor body and the harness includes a bush member that holds air-tightness in the connecting portion. The bush member is formed of a material having flexibility, e.g., rubber, and adopts heat-resistant rubber to withstand a high-temperature atmosphere.

Here, typically, the engine of the utility vehicle which is driven on irregular ground is mounted in a space which is in the center or rear position in the front-rear direction of the vehicle and is in the high position, e.g., below the seat or in a space which is in the console box arranged between the left and right seats and is surrounded at its bottom by the under cover, so as to be unlikely to be affected by an obstacle on the ground. The exhaust pipes connected to the engine are arranged in a rear space which is connected to the rear portion of the space and surrounded by e.g., the heat insulating plate and the under cover. As a result, the exhaust gas sensor attached to the exhaust pipes is also located in the rear space which is away from the front portion of the vehicle and surrounded by the heat insulating plate and the under cover.

The rear space is blocked at its front by the engine. Traveling wind from the front portion of the vehicle is thus unlikely to reach the rear space. In addition, the inside of the rear space is surrounded at its left, right, top, and bottom by the heat insulating plate and the under cover. Traveling wind from the sides or bottom of the vehicle is also unlikely to reach the rear space. Further, the inside of the rear space is brought into a high-temperature atmosphere by heat radiated from the surfaces of the exhaust pipes arranged therein. Consequently, the exhaust gas sensor located in the rear space is required to have higher heat resistance. The bush member having a high allowable temperature is thus adopted. As a result, the cost of the exhaust gas sensor is increased.

To reduce the temperature of the exhaust gas sensor attached to the exhaust pipes, it has been known that a guide member is provided which guides traveling wind taken in from the front portion of the vehicle to the exhaust gas sensor arranged in the front portion of the vehicle. As the prior art document, there is Japanese Unexamined Patent Publication No. 2012-127202.

However, as described above, in the utility vehicle, the exhaust gas sensor is located away from the front portion of the vehicle, and is arranged behind the engine. It is thus difficult to guide the traveling wind from the front portion of the vehicle to the exhaust gas sensor located behind the engine by the guide member, which is described in the prior art document.

SUMMARY OF THE INVENTION

The present invention has been made in view of the above problems, and an object of the present invention is to provide an exhaust apparatus which can inhibit the temperature increase in an exhaust gas sensor with a simple configuration.

To achieve the above object, the present invention provides an exhaust apparatus for a utility vehicle which discharges exhaust gas from a plurality of exhaust pipes connected to exhaust ports of an engine including a plurality of cylinders, the apparatus including an exhaust gathering pipe portion gathering the exhaust pipes, a catalyst portion located on a downstream side of the exhaust gathering portion and purifying the exhaust gas, and a sensor attaching pipe provided between the exhaust gathering portion and the catalyst portion and to which an exhaust gas sensor is detachably attached, wherein the sensor attaching pipe, in a state where the exhaust gas sensor is attached, has a height in which a sensing portion of the exhaust gas sensor is located in the sensor attaching pipe, and the sensor attaching pipe is provided such that a top end to which the exhaust gas sensor is detachably attached is located above a base end and away from a surrounding heat source.

With the above configuration, the sensor attaching pipe has a height in which the sensing portion of the exhaust gas sensor is located in the sensor attaching pipe. Therefore, the exhaust gas sensor is not directly exposed to the mainstream of exhaust gas in the exhaust pipes. Heat transfer from the mainstream of the exhaust gas to the exhaust gas sensor can thus be inhibited.

In addition, the sensor attaching pipe is provided such that the top end is away from the surrounding heat source. Heat release from the surrounding heat source to the exhaust gas sensor can thus be reduced. As a result, the temperature increase in the exhaust gas sensor can be inhibited to relax the heat resistance requirement for the exhaust gas sensor.

Further, the top end of the sensor attaching pipe is arranged above the base end. Condensed water which may be generated in the exhaust pipes can thus be prevented from flowing into the sensor attaching pipe. Accordingly, the condensed water can be prevented from pouring onto the sensing portion of the exhaust gas sensor. The durability of the exhaust gas sensor can thus be improved.

In the exhaust apparatus, preferably, the top end of the sensor attaching pipe is tilted toward an exhaust downstream side.

With the above configuration, the top end of the sensor attaching pipe is tilted toward the exhaust downstream side. Accordingly, when an exhaust portion of the engine is located on the exhaust upstream side of the exhaust gas sensor, the distance between the exhaust portion and the exhaust gas sensor can be increased. The temperature increase in the exhaust gas sensor due to heat release from the exhaust portion can thus be inhibited.

In the exhaust apparatus, preferably, punching metals for holding noise absorbing members are provided on inner surfaces of the exhaust gathering portion, an inside of the sensor attaching pipe and an inside of the exhaust pipes communicating with each other through holes in the punching metals. To allow for communication between the sensor attaching pipe and the exhaust gathering pipe, the noise absorbing members are positioned away from the boss attaching hole of the exhaust gathering pipe.

With the above configuration, the inside of the sensor attaching pipe and the inside of the exhaust pipes communicate with each other through the holes in the punching metals. While the punching metals can prevent condensed water which may be generated in the exhaust pipes from flowing into the sensor attaching pipe, exhaust gas can be flowed into the sensor pipe through the holes. That is, while the condensed water can be prevented from pouring onto the sensing portion of the exhaust gas sensor, sensing ability of the exhaust gas sensor can be ensured.

In the exhaust apparatus, the utility vehicle includes a continuously variable V-belt transmission having a cooling device, the cooling device includes an exhaust duct that discharges air in the continuously variable V-belt transmission, and the exhaust duct includes at a discharge port a guiding member for guiding the air discharged from the exhaust duct to the exhaust gas sensor.

With the above configuration, the exhaust duct of the continuously variable V-belt transmission includes at the discharge port the guiding member for guiding the air discharged from the discharge port to the exhaust gas sensor. The air discharged from the exhaust duct can thus be guided to the exhaust gas sensor to cool the exhaust gas sensor. The temperature increase in the exhaust gas sensor can thus be further inhibited.

In the exhaust apparatus, an exhaust upstream end of the catalyst portion is abutted onto exhaust downstream ends of the punching metals to perform positioning in an exhaust flow direction of the catalyst pipe portion in the exhaust pipes.

With the above configuration, the exhaust upstream end of the catalyst portion is abutted Onto the exhaust downstream ends of the punching metals. Therefore, the positioning in the exhaust flow direction of the catalyst portion in the exhaust pipes can be easily performed. The assembling of the catalyst portion to the exhaust pipes can thus be improved.

DETAILED DESCRIPTION OF THE INVENTION

Embodiment

FIGS. 1 to 6 show an exhaust apparatus according to the present invention and a utility vehicle having the exhaust apparatus. An embodiment of the present invention will be described with reference to these drawings. For convenience of the description, the front-rear direction of the vehicle is referred to as the front-rear direction of the engine, the exhaust apparatus, and other components, and in the vehicle width direction, the left-right direction seen from the driver in the vehicle (the left and right seen from the rear of the vehicle) is referred to as the left-right direction of the vehicle, the engine, the exhaust apparatus, and other components.

Overall Configuration of Utility Vehicle

Figure 1:
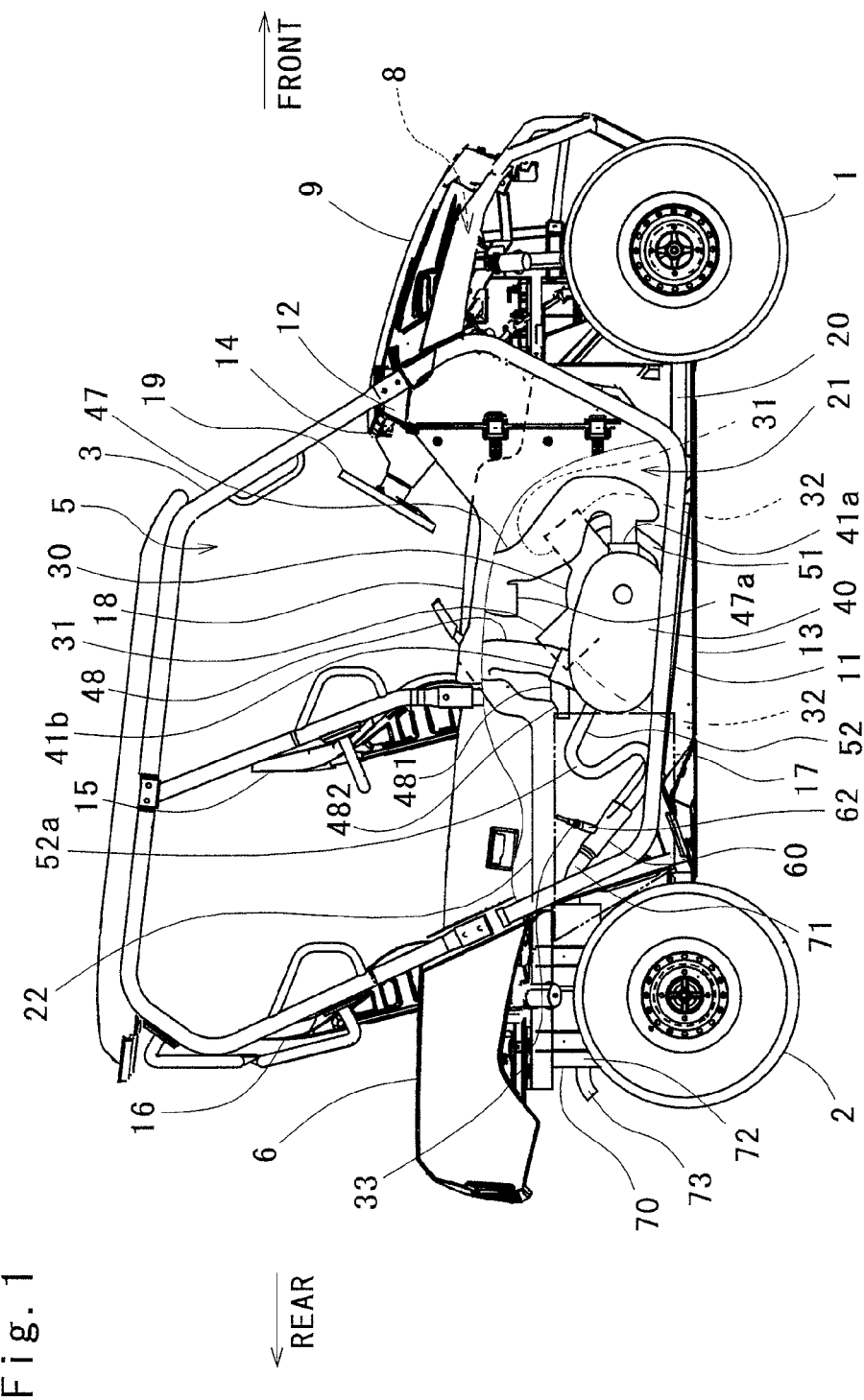
FIG. 1 is a schematic side view of a utility vehicle having an exhaust apparatus according to the present invention.
Figure 2:
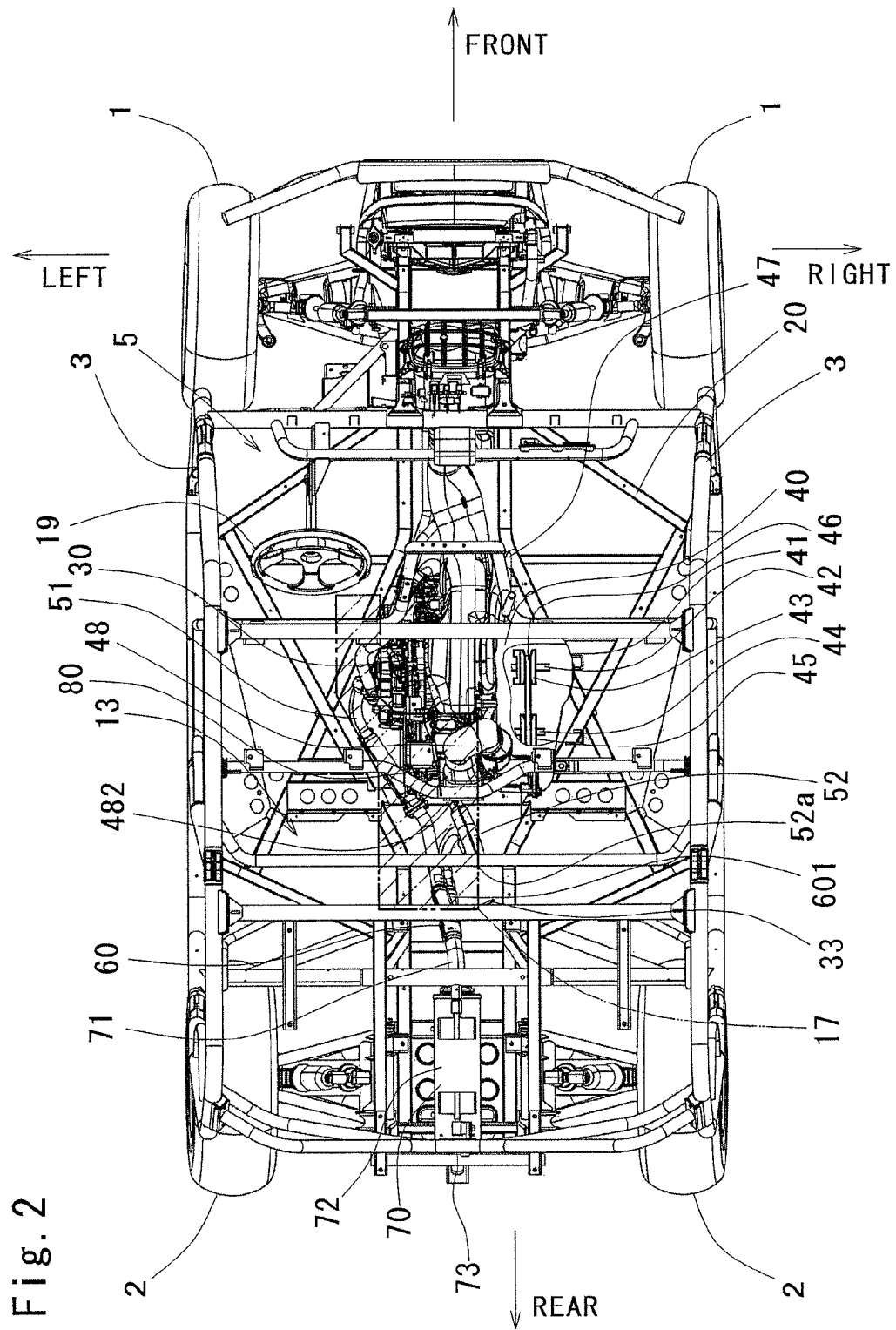
FIG. 2 is a schematic plan view of the utility vehicle of FIG. 1.

FIG. 1 is a right side view of a utility vehicle, and FIG. 2 is a plan view showing the inside of the utility vehicle from which an outline configuring member is detached. In FIG. 1, the utility vehicle includes a pair of left and right front wheels 1 at its front, a pair of left and right rear wheels 2 at its rear, a riding space 5 surrounded by a ROPS 3 between the front wheels 1 and the rear wheels 2, and a cargo bed 6 behind the riding space 5. The ROPS 3 is the abbreviation of a rollover protective structure.

To the front of the riding space 5, a hood chamber (space) 8 surrounded by the left and right front wheels 1 and a hood 9 is provided. The hood chamber 8 and the riding space 5 are partitioned by a dashboard 12 and a partitioning plate (not shown). On the rear surface of the dashboard 12, an operating panel 14 to which various meters and switches are attached and a steering wheel 19 for steering the vehicle are provided.

In the riding space 5, a floor panel 11 forming a floor surface, a pair of left and right front seats 15, and a pair of left and right rear seats 16 are provided. A console box 18 is provided between the pair of left and right front seats 15. A floor tunnel 22 is provided between the pair of left and right rear seats 16.

The console box 18 is configured to accommodate therein an engine 30 and a V-belt type continuously variable transmission 40, has a substantially inverted U-shaped cross section projecting upward at the substantially center in the vehicle width direction, and is formed to extend rearward from the rear end of the hood chamber 8 so as to cover the engine 30 and the continuously variable V-belt transmission 40.

The floor tunnel 22 is configured to accommodate therein an exhaust apparatus, has a substantially inverted U-shaped cross section projecting upward from the substantially center in the vehicle width direction of the floor panel 11, and is formed to extend in the front-rear direction from the console box 18 to the rear of the rear seats 16. A heat insulating plate 17 is provided on the wall surface of the floor tunnel 22 on the outer side of the vehicle. The heat insulating plate 17 prevents heat radiated from the exhaust apparatus from transferring into the riding space 5. As indicated by hatching in FIG. 2, the heat insulating plate 17 is formed to cover the periphery of the exhausting apparatus.

In FIG. 1, an under cover 13 is attached below the console box 18 and the floor tunnel 22. That is, a space (engine room) 21 surrounded at its left, right, top, and bottom is formed in the console box 18 and the floor tunnel 22. The engine 30, the V-belt type continuously variable transmission 40, and the exhaust apparatus are arranged in the space.

The engine 30 is a V-type two-cylinder engine in which two cylinders are arranged in the front-rear direction in substantially V-shape, is attached to a body frame 20 by means of engine mount rubber (not shown), and is located at the substantially center in the vehicle width direction in the space 21. Each cylinder of the engine 30 includes an air intake portion 31 on the side between the cylinders opposite to each other (the inside of the bank), and an exhaust portion 32 on the opposite side (the outside of the bank).

In FIG. 2, the continuously variable V-belt transmission 40 is attached on the right side surface of the engine 30, and includes a housing 41, a driving shaft 42 which can be coupled to the crankshaft (not shown) of the engine 30, a driving pulley 43 arranged on the driving shaft 42, a driven shaft 44 which is an input shaft to a shifting mechanism 80, a driven pulley 45 arranged on the driven shaft 44, and a V-belt 46 entrained between the driving pulley 43 and the driven pulley 45. The housing 41 includes an air intake port 41*a* (see FIG. 1) opened forward in its front portion, and an air discharge port 41b (see FIG. 1) opened upward in its rear portion.

Overall Configuration of Exhaust Apparatus for Engine

In FIG. 2, the exhaust apparatus includes, from the exhaust upstream side, a front cylinder exhaust pipe 51 connected to the exhaust portion 32 of the front cylinder (see FIG. 1), a rear cylinder exhaust pipe 52 connected to the exhaust portion 32 of the rear cylinder (see FIG. 1), an exhaust gathering pipe 60 arranged behind the engine 30, an exhaust muffler 70 connected to the rear end of the exhaust gathering pipe 60. The exhaust paths of the front cylinder exhaust pipe 51 and the rear cylinder exhaust pipe 52 are gathered in the exhaust gathering pipe 60 to lead to the exhaust muffler 70. An exhaust gas sensor 33 (see FIG. 1) is attached to the exhaust gathering pipe 60 via a sensor attaching pipe 62 (see FIG. 1), and senses the particular ingredient in exhaust gas in the exhaust gathering pipe 60. As the exhaust gas sensor 33, for example, an oxygen concentration sensor sensing the oxygen concentration in exhaust gas, an air/fuel ratio sensor sensing the air/fuel ratio in exhaust gas and so on, can be used. The exhaust apparatus configuring members will be described below in detail.

Front Cylinder Exhaust Pipe and Rear Cylinder Exhaust Pipe

Figure 3:
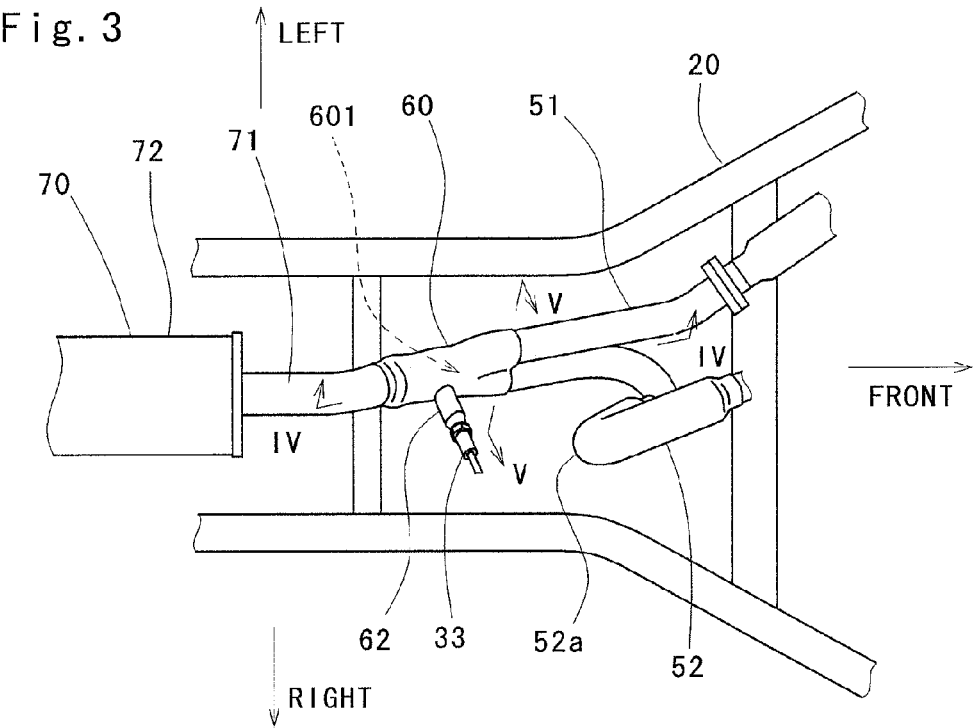
FIG. 3 is an enlarged plan view of an exhaust gathering portion.

FIG. 3 is a plan view of the exhaust gathering portion. The front cylinder exhaust pipe 51 extends downward from the exhaust portion 32 of the front cylinder (see FIG. 1) to be bent rearward from the left side surface of the engine 30, and is connected to the front end of the exhaust gathering pipe 60. The rear cylinder exhaust pipe 52 is connected to the front end of the exhaust gathering pipe 60 via a bent portion 52a projecting rearward from the exhaust portion 32 of the rear cylinder (see FIG. 1).

Exhaust Gathering Pipe

Figure 4:
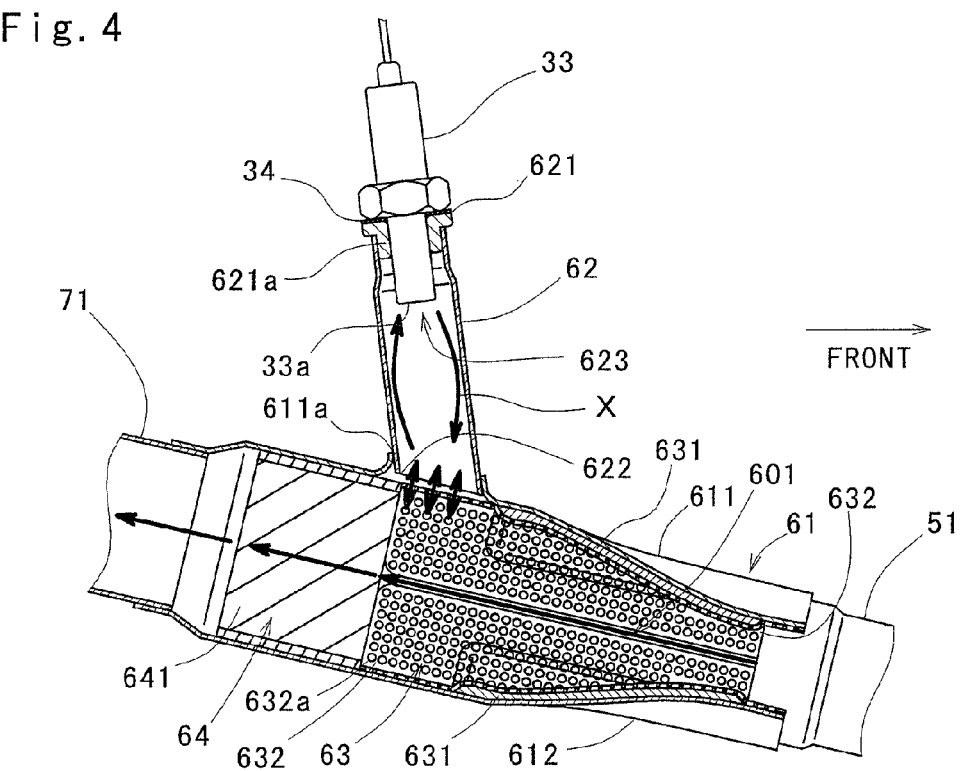
FIG. 4 is an enlarged sectional view taken along line IV-IV of FIG. 3.

FIG. 4 is an enlarged sectional view taken along line IV-IV of FIG. 3. The exhaust gathering pipe 60 includes a housing 61, the sensor attaching pipe 62 joined to the upper portion of the housing 61, a noise absorbing unit 63 arranged in the housing 61, and an exhaust gas purifying unit 64 arranged on the downstream side of the noise absorbing unit 63 in the housing 61.

Figure 5:
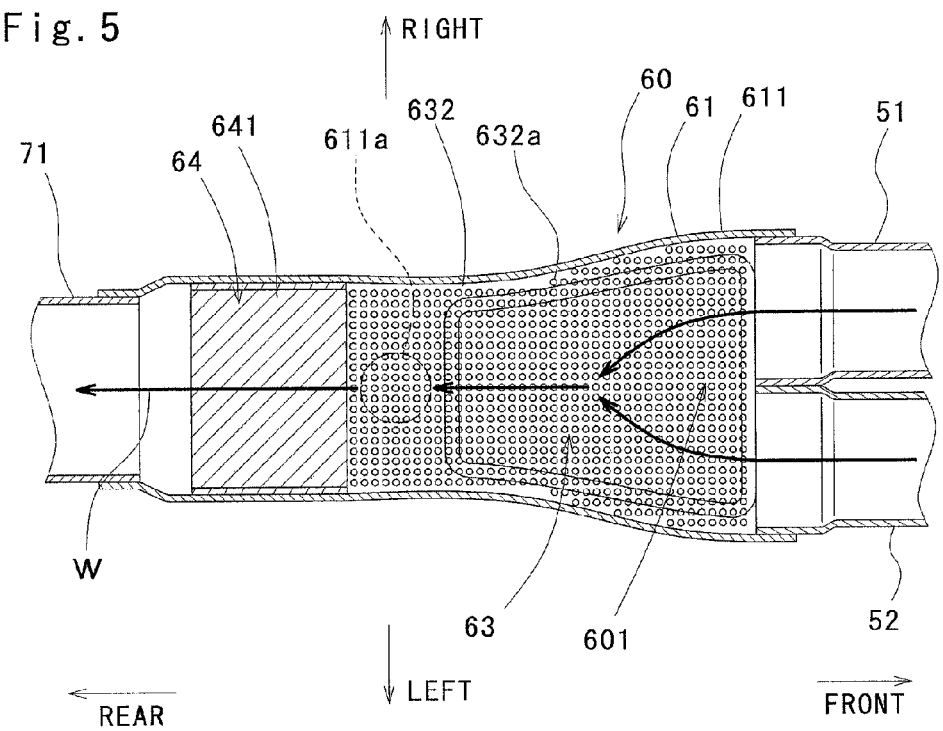
FIG. 5 is an enlarged sectional view taken along line V-V of FIGS. 3.

The housing 61 is formed to join an upper housing 611 and a lower housing 612 by welding. FIG. 5 is an enlarged sectional view taken along line V-V of FIG. 3. The housing 61 is two-forked, and includes an inlet connecting the front cylinder exhaust pipe 51 and the rear cylinder exhaust pipe 52 at its front end, and an outlet connected to the exhaust muffler 70 at its rear end. The housing 61 is provided with an exhaust gathering pipe portion 601 gathering exhaust gas discharged from the front cylinder exhaust pipe 51 and exhaust gas discharged from the rear cylinder exhaust pipe 52.

As shown in FIG. 4, the sensor attaching pipe 62 is cylindrical, and is arranged between the noise absorbing unit 63 and the exhaust gas purifying unit 64. In the exhaust gas sensor 33, a base end 622 is inserted into a boss attaching hole 611a opened in the upper housing 611 to be joined by welding to the peripheral edge of the boss attaching hole 611a. As shown in FIGS. 2 and 3, the sensor attaching pipe 62 is fixed to allow a top (remote) end 621 to which the exhaust gas sensor 33 is detachably attached away from the bent portion 52a of the rear cylinder exhaust pipe 52 located to the front of the top end 621, that is, to be tilted rearward with respect to the upper housing 611.

As shown in FIG. 4, the sensor attaching pipe 62 includes a sensor attaching boss 621a at the top end 621, and a sub-chamber 623 for the exhaust gas sensor 33 to sense exhaust gas between the top end 621 and the base end 622. The exhaust gas sensor 33 is detachably attached to the top end 621 (sensor attaching boss 621a) across a heat-resistant gasket 34, and is sealed so as not to leak exhaust gas from between the top end 621 and the exhaust gas sensor 33 to the outside. The sensor attaching pipe 62 has a height (length from the top end 621 to the base end 622) in which a sensing portion 33a of the exhaust gas sensor 33 is spaced from the inside of the housing 61 in a state where the exhaust gas sensor 33 is attached to the top end 621.

The height of the sensor attaching pipe 62 is preferably set to 1 to 2 times, more preferably, 1 to 1.5 times the diameter of exhaust pipe to which the sensor attaching pipe is joined. When the height of the sensor attaching pipe 62 is too high, high stress can be caused onto the joining portion of the sensor attaching pipe 62 and the upper housing 611 (boss attaching hole 611a) at the time of vibration of the exhaust gas sensor 33.

In FIG. 5, the noise absorbing unit 63 reduces exhaust noise of exhaust gases discharged from the front cylinder exhaust pipe 51 and the rear cylinder exhaust pipe 52 and exhaust interference noise caused when these exhaust gases gather in the gathering portion 601 in the exhaust gathering pipe 60. In FIG. 4, the noise absorbing unit 63 includes a pair of upper and lower noise absorbing members 631 arranged around the exhaust gathering portion 601, except that the noise absorbing members 631 are absent from a location adjacent to the boss attaching hole 611a. A pair of upper and lower punching metals 632 hold the noise absorbing members 631 between the upper housing 611 and the lower housing 612. As each noise absorbing member 631, for example, glass wool can be used. As each punching metal 632, a stainless steel plate having a large number of holes 632a having a diameter of 1 to 3 mm can be used.

In FIG. 5, the punching metals 632 extend from the front end of the housing 61 to the rear end of the boss attaching hole 611a therebehind. Accordingly, the boss attaching hole 611a is covered on the inner side of the housing 61 by the punching metals 632. The inside of the sensor attaching pipe 62 (see FIG. 4) and the inside of the housing 61 thus communicate with each other through the holes 632a in the punching metals 632.

As shown in FIGS. 4 and 5, the exhaust gas purifying unit 64 includes a catalyst portion 641. The catalyst portion 641 is positioned in the front-rear direction in the exhaust gathering pipe 60 by substantially abutting its front end onto the rear ends of the punching metals 632, and is joined by welding to the upper housing 611 and the lower housing 612.

Exhaust Muffler

As shown in FIG. 2, the exhaust muffler 70 includes a rear exhaust pipe 71 connected to the rear end of the exhaust gathering pipe 60, a substantially cylindrical noise eliminating unit 72 connected to the rear end of the rear exhaust pipe 71, and a tail pipe 73 connected to the rear end of the noise eliminating unit 72.

Configuration of Cooling Device for V-Belt Type Continuously Variable Transmission In FIG. 1, the V-belt type continuously variable transmission 40 includes a cooling device for cooling the inside. The cooling device includes a cooling pipe 47 connected to the air intake port 41a, and an exhaust duct 48 connected to the air discharge port 41b.

An air intake port 47a of the cooling pipe 47 is opened downward at a location above the engine 30 in the space 21, and a discharge port 481 of the exhaust duct 48 is opened downward at a location above the continuously variable V-belt transmission 40 in the space 21. In addition, a guiding member 482 configured to guide air discharged from the discharge port 481 toward the exhaust gas sensor 33 is provided at the discharge port 481.

Figure 6:
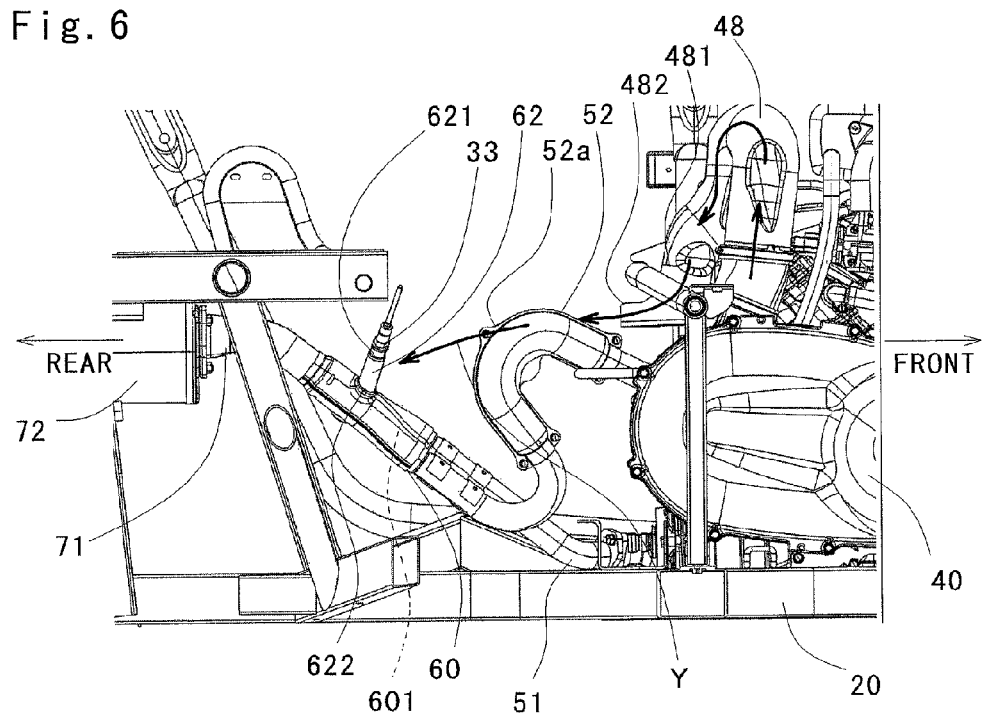
FIG. 6 is a side view of the exhaust gathering portion.

FIG. 6 is a side view showing the inside of the console box 18 and the heat insulating plate 17. The discharge port 481 of the exhaust duct 48 is located in front of the exhaust gas sensor 33. Here, the guiding member 482 is configured to be surrounded on its four surfaces including bottom, front, left, and right walls (regulating walls) to guide air discharged from the exhaust duct 48 to the rear. The guiding member 482 is configured to receive air discharged from above on the bottom wall, regulate the air discharging direction by the front, left, and right walls, and then guide the air to the exhaust gas sensor 33 therebehind.

Flow and Operation of Exhaust Gas

In FIG. 2, exhaust gases discharged from the cylinders of the engine 30 into the exhaust paths in the front cylinder exhaust pipe 51 and the rear cylinder exhaust pipe 52 reach the front end of the exhaust gathering pipe 60. Then, as indicated by arrows W in FIG. 5, the exhaust gases discharged from the front cylinder exhaust pipe 51 and the rear cylinder exhaust pipe 52 join in the exhaust gathering portion 601. Exhaust noise in the exhaust gathering portion 601 and exhaust interference noise which may be caused when the two exhaust paths are joined can be reduced by being absorbed by the noise absorbing members 631 through the holes 632a in the punching metals 632 provided in the exhaust gathering portion 601.

As indicated by arrows X in FIG. 4, exhaust gas in the exhaust gathering portion 601 flows toward the exhaust gas purifying unit 64 on the downstream side, and part thereof flows into the sensor attaching pipe 62 through the holes 632a in the punching metals 632. The exhaust gas Which has flowed into the sensor attaching pipe 62 reaches the sensing portion 33a of the exhaust gas sensor 33. The sensing portion 33a senses the particular ingredient in the exhaust gas. Then, the exhaust gas reaches the exhaust gas purifying unit 64 to be purified by the catalyst portion 641. In FIG. 2, the exhaust gas flows from the rear end of the exhaust gathering pipe 60 through the rear exhaust pipe 71 into the noise eliminating unit 72. The exhaust gas whose exhaust noise is sufficiently reduced in the noise eliminating unit 72 is released into the atmosphere through the tail pipe 73.

Flow and Operation of Air in Cooling Device provided in V-Belt Type Continuously Variable Transmission In FIG. 1, while the vehicle is driven, air in the space 21 is taken in from the air intake port 47a of the cooling pipe 47 and flows through the cooling pipe 47 into the air intake port 41a of the V-belt type continuously variable V-belt transmission 40. The air which has flowed into the air intake port 41a is taken into the housing 41 by the rotation of the driving pulley 43 (see FIG. 2), and cools each component in the housing 41. The air is then discharged from the exhaust duct 48 through the air discharge port 41b by the rotation of the driven pulley 45 (see FIG. 2).

In FIG. 6, the guiding member 482 guiding air to the exhaust gas sensor 33 therebehind is provided at the discharge port 481 of the exhaust duct 48. As indicated by arrows Y in FIG. 6, the air discharged from the exhaust duct 48 is guided to the exhaust gas sensor 33.

Effects of Embodiment (1) As shown in FIG. 4, the sensor attaching pipe 62 has a height in which the sensing portion 33a of the exhaust gas sensor 33 is located in the sensor attaching pipe 62. Thus, the sensing portion 33a of the exhaust gas sensor 33 is not directly exposed to the mainstream of exhaust gas in the exhaust pipes. Accordingly, heat transfer from the exhaust gas flow to the exhaust gas sensor 33 can be reduced. In addition, the distance between the exhaust gas sensor 33 and the surfaces of the exhaust pipes is larger than when the sensing portion 33a is arranged in the housing 61. Thus, heat release from the surfaces of the exhaust pipes to the exhaust gas sensor 33 can be reduced:

In addition, the top end 621 of the sensor attaching pipe 62 is formed to be away from the surrounding heat source, in this embodiment, to be away from the bent portion 52a of the rear cylinder exhaust pipe 52 located in front of the exhaust gas sensor 33. The distance between the bent portion 52a and the exhaust gas sensor 33 can thus be increased to reduce heat release from the bent portion 52a to the exhaust gas sensor 33.

Therefore, heat transfer from exhaust gas through the sensing portion 33a to the exhaust gas sensor 33 can be reduced, heat release from the surface of the exhaust gathering pipe 60 can be reduced, and heat release from the bent portion 52a of the rear cylinder exhaust pipe 52 located in front of the exhaust gas sensor 33 can be reduced. That is, according to the present invention, even when the exhaust gas sensor 33 is arranged in the space 21 where traveling wind is hard to reach, the temperature increase in the exhaust gas sensor 33 can be inhibited. In other words, the heat resistance requirement for the exhaust gas sensor 33 can be relaxed to reduce the cost of the exhaust gas sensor 33.

(2) In FIG. 4, the top end 621 of the sensor attaching pipe 62 is arranged above the base end 622. Thus, condensed water which may be generated in the exhaust pipes can be prevented from flowing into the sensor attaching pipe 62. In addition, the inside of the sensor attaching pipe 62 and the inside of the exhaust gathering pipe 60 communicate with each other through the holes 632a in the punching metals 632. While the punching metals 632 prevent condensed water which may be generated in the exhaust gathering pipe 60 from flowing into the sensor attaching pipe 62, flow of exhaust gas through the holes 632a into the exhaust gas sensor 33 can be ensured. That is, while the condensed water can be prevented from flying onto the exhaust gas sensor 33, the sensing ability of the exhaust gas sensor 33 can be ensured.

(3) In FIG. 6, the guiding member 482 is provided at the discharge port 481 of the exhaust duct 48 of the V-belt type continuously variable V-belt transmission 40, and guides air discharged from the discharge port 481 to the exhaust gas sensor 33. Air discharged from the exhaust duct 48 can thus be guided to the exhaust gas sensor 33 to cool the exhaust gas sensor 33, and the temperature of the exhaust gas sensor 33 can be further reduced. Therefore, the heat resistance requirement for the exhaust gas sensor 33 can be further relaxed. The cost of the exhaust gas sensor 33 can thus be further reduced.

(4) In FIG. 4, the end of the catalyst portion 641 of the exhaust gas purifying unit 64 is abutted onto the rear ends of the punching metals 632. Therefore, the positioning in the front-rear direction of the catalyst pipe portion 641 in the exhaust gathering pipe 60 can be easily performed. The assembling ability of the exhaust gathering pipe 60 can thus be improved.

Other Embodiments

In the utility vehicle of FIG. 1, the engine 30 is arranged in the space 21 formed inside the console box 18 between the pair of left and right front seats 15. However, the present invention is not limited thereto, and is applicable to the utility vehicle on which the engine 30 is mounted below the rear seat 16 or the cargo bed 6. In brief, the present invention is applicable to the utility vehicle in which the exhaust apparatus is arranged in the space where traveling wind from the front portion is hard to reach.

In addition, in this embodiment, the sensor attaching pipe is a cylindrical member. However, the present invention is not limited thereto, and is applicable to the sensor attaching pipe having a rectangular cross section.

Further, the engine 30 mounted on the utility vehicle of FIG. 1 is a V-type two-cylinder engine. However, the present invention is not limited thereto, and is applicable to the utility vehicle on which the engine including a plurality of cylinders in series or the V-type engine including three or more cylinders is mounted.

The present invention is not limited to the embodiments described above, and can adopt various modifications within the scope not departing from the claims.

What is claimed is:

1. An exhaust apparatus for a utility vehicle which discharges exhaust gas from a plurality of exhaust pipes connected to exhaust ports of cylinders, the apparatus comprising:
   an exhaust gathering pipe having an exhaust gathering pipe portion connected to the exhaust pipes and a catalyst pipe portion located on a downstream side of the exhaust gathering pipe portion to purify the exhaust gas;
   a sensor attaching pipe provided on the exhaust gathering pipe between the exhaust gathering pipe portion and the catalyst pipe portion, said sensor attaching pipe has a base end attached to the exhaust gathering pipe, and a remote end opposite the base end disposed remotely from the exhaust gathering pipe;
   an exhaust gas sensor detachably attached to the remote end of the sensor attaching pipe, said exhaust gas sensor having a sensing portion located at a distal end thereof nearest to the exhaust gathering pipe, wherein
   the sensor attaching pipe is tilted relative to said exhaust gathering pipe such that the remote end of the sensor attaching pipe is located above the base end of the sensor attaching pipe and away from a surrounding heat source, and
   the sensor attaching pipe has a height so that the sensing portion at the distal end of the exhaust gas sensor is located within the sensor attaching pipe.

2. The exhaust apparatus for the utility vehicle according to claim 1, wherein the remote end of the sensor attaching pipe is tilted relative to the exhaust gathering pipe toward an exhaust downstream side.

3. The exhaust apparatus for the utility vehicle according to claim 1, wherein
   the utility vehicle includes a continuously variable V-belt transmission having a cooling device,
   the cooling device includes an exhaust duct arranged to discharge air in the continuously variable V-belt transmission, and
   regulating walls provided at an outlet of the exhaust duct are configured to receive the discharged air, regulate air discharging direction, and guide the discharged air to the exhaust gas sensor.

4. The exhaust apparatus for the utility vehicle according to claim 1, wherein
   punching metals are provided on inner surfaces of the exhaust gathering pipe portion, said punching metals having holes therein;
   an inside of the sensor attaching pipe and an inside of the exhaust gathering pipe communicating with each other through the holes in the punching metals;
   a boss attaching hole is formed in the exhaust gathering pipe and communicates betwee the inside of the sensor attaching pipe and the inside of the exhaust gathering pipe; and
   noise absorbing members are provided along the inner surfaces of the exhaust gathering pipe portion, except that said noise absorbing members are absent from a location adjacent to the boss attaching hole.

5. The exhaust apparatus for the utility vehicle according to claim 4, wherein
   the catalyst pipe portion has an exhaust upstream end abutted onto exhaust downstream ends of the punching metals to perform positioning in an exhaust flow direction of the catalyst pipe portion in the exhaust pipes.

* * * * *